(12) United States Patent
Lin et al.

(10) Patent No.: US 11,477,364 B1
(45) Date of Patent: Oct. 18, 2022

(54) SOLID-STATE IMAGE SENSOR

(71) Applicant: VisEra Technologies Company Limited, Hsin-Chu (TW)

(72) Inventors: Cheng-Hsuan Lin, Taipei (TW); Zong-Ru Tu, Zhubei (TW); Yu-Chi Chang, Hsinchu County (TW); Han-Lin Wu, Hsin-Chu (TW); Hung-Jen Tsai, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 17/405,518

(22) Filed: Aug. 18, 2021

Related U.S. Application Data

(60) Provisional application No. 63/169,579, filed on Apr. 1, 2021.

(51) Int. Cl.
*H04N 5/232* (2006.01)

(52) U.S. Cl.
CPC .............................. *H04N 5/232127* (2018.08)

(58) Field of Classification Search
CPC ............ H04N 9/0455; H04N 5/232127; H01L 27/14629; H01L 27/14625; H01L 27/14623; H01L 27/14621; H01L 27/14645; H01L 27/14685
USPC .......................................................... 348/308
See application file for complete search history.

(56) References Cited

U.S. PATENT DOCUMENTS

| | | | | |
|---|---|---|---|---|
| 10,681,290 | B1 * | 6/2020 | Hsu | H04N 5/3658 |
| 11,265,496 | B2 * | 3/2022 | Kim | H04N 9/0455 |
| 11,372,196 | B2 * | 6/2022 | Uchida | G02B 7/09 |
| 11,375,100 | B2 * | 6/2022 | Kim | H01L 27/14612 |
| 2019/0075233 | A1 | 3/2019 | Gluskin et al. | |
| 2019/0297291 | A1 | 9/2019 | Kim et al. | |
| 2020/0154057 | A1 * | 5/2020 | Hosokawa | G03B 13/36 |
| 2020/0236312 | A1 | 7/2020 | Murata | |
| 2020/0280659 | A1 | 9/2020 | Gluskin | |
| 2021/0028204 | A1 * | 1/2021 | Fujita | H01L 27/14645 |
| 2021/0126029 | A1 * | 4/2021 | Roh | H01L 27/14645 |
| 2021/0136303 | A1 * | 5/2021 | Kim | H04N 9/0455 |

(Continued)

FOREIGN PATENT DOCUMENTS

CN    110062144 A    7/2019

OTHER PUBLICATIONS

An Office Action dated Aug. 12, 2022 in TW Application No. 111100887 is attached, 6 pages.

*Primary Examiner* — Pritham D Prabhakher
(74) *Attorney, Agent, or Firm* — Muncy, Geissler, Olds & Lowe, P.C.

(57) ABSTRACT

A solid-state image sensor having a first region and a second region adjacent to the first region along a first direction is provided. The solid-state image sensor includes a first unit pattern disposed in the first region. The solid-state image sensor also includes a second unit pattern disposed in the second region and corresponding to the first unit pattern. The first unit pattern and the second unit pattern each includes normal pixels and an auto-focus pixel array. The normal pixels and the auto-focus pixel array in the first unit pattern form a first arrangement, the normal pixels and the auto-focus pixel array in the second unit pattern form a second arrangement, and the first arrangement and the second arrangement are symmetric with respect to the first axis of symmetry.

14 Claims, 12 Drawing Sheets

(56) References Cited

U.S. PATENT DOCUMENTS

2021/0288090 A1* 9/2021 Li ................... H01L 27/14621
2021/0377438 A1* 12/2021 Kita ...................... G02B 7/34

* cited by examiner

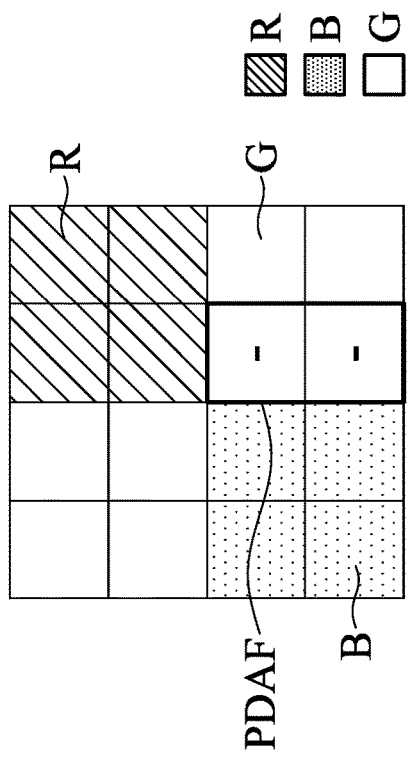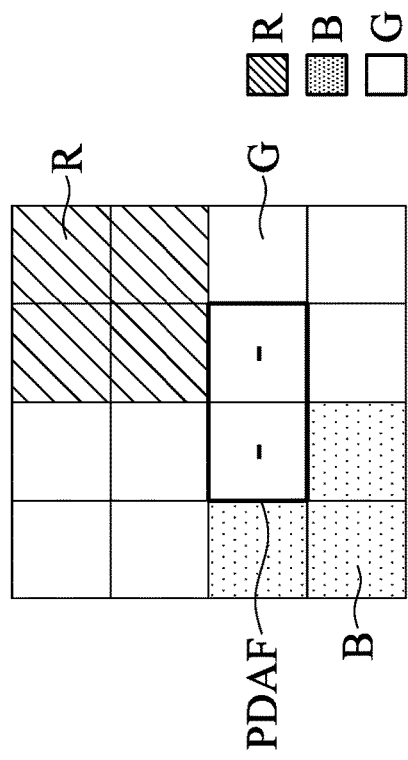
FIG. 3E    FIG. 3F
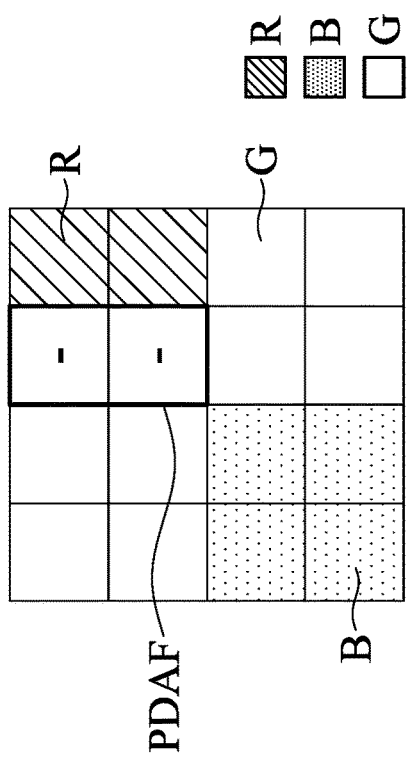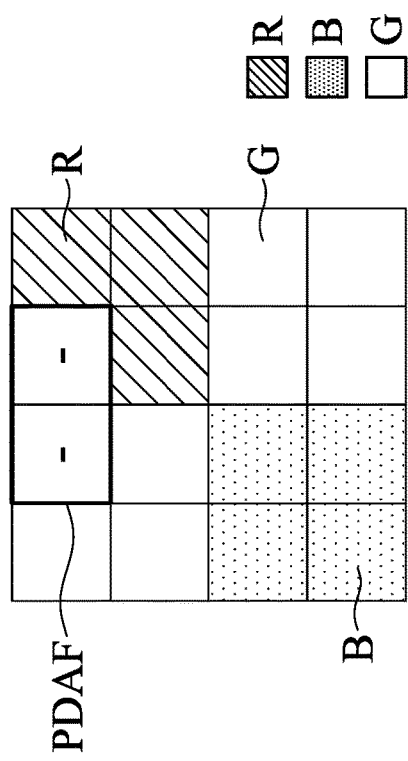
FIG. 3G    FIG. 3H

SOLID-STATE IMAGE SENSOR

CROSS REFERENCE TO RELATED APPLICATIONS

This application claims the benefit of U.S. Provisional Application No. 63/169,579, filed on Apr. 1, 2021, the entirety of which is incorporated by reference herein.

BACKGROUND

Technical Field

The embodiments of the present disclosure relate to image sensors, and in particular they relate to solid-state image sensors with a symmetrical pattern design.

Description of the Related Art

Solid-state image sensors (e.g., complementary metal-oxide semiconductor (CMOS) image sensors) have been widely used in various image-capturing apparatuses such as digital still-image cameras, digital video cameras, and the like. Signal electric charges may be generated according to the amount of light received in the light-sensing portion (e.g., photoelectric conversion element) of the solid-state image sensor. In addition, the signal electric charges generated in the light-sensing portion may be transmitted and amplified, whereby an image signal is obtained.

In general, repeating Bayer patterns are often used in traditional solid-state image sensors. However, since the pixels in each unit pattern on the side closest to the light source have different energy from others, when there are phase detection auto focus (PDAF) pixels in each pattern, patterns on opposite sides (e.g., left side and right side, or upper side and lower side) need to adopt different and complicated image signal processing (ISP) (signal compensation).

BRIEF SUMMARY

According to some embodiments of the present disclosure, the solid-state image sensor has a symmetrical pattern design, which may effectively simplify the image signal processing (signal compensation).

In accordance with some embodiments of the present disclosure, a solid-state image sensor having a first region and a second region adjacent to the first region along a first direction is provided. The solid-state image sensor includes a first unit pattern disposed in the first region. The solid-state image sensor also includes a second unit pattern disposed in the second region and corresponding to the first unit pattern. The first unit pattern and the second unit pattern each includes normal pixels and an auto-focus pixel array. The normal pixels and the auto-focus pixel array in the first unit pattern form a first arrangement, the normal pixels and the auto-focus pixel array in the second unit pattern form a second arrangement, and the first arrangement and the second arrangement are symmetric with respect to the first axis of symmetry.

In some embodiments, the normal pixels receive at least two different colors.

In some embodiments, the solid-state image sensor has a third region adjacent to the first region along a second direction that is perpendicular to the first direction, and the solid-state image sensor further includes a third unit pattern disposed in the third region and corresponding to the first unit pattern. The third unit pattern includes the normal pixels and the auto-focus pixel array, the normal pixels and the auto-focus pixel array in the third unit pattern form a third arrangement, and the first arrangement and the third arrangement are symmetric with respect to a second axis of symmetry that is perpendicular to the first axis of symmetry.

In some embodiments, the solid-state image sensor has a fourth region adjacent to the second region along the second direction, and the solid-state image sensor further includes a fourth unit pattern disposed in the fourth region and corresponding to the second unit pattern. The fourth unit pattern includes the normal pixels and the auto-focus pixel array, the normal pixels and the auto-focus pixel array in the fourth unit pattern form a fourth arrangement, and the second arrangement and the fourth arrangement are symmetric with respect to the second axis of symmetry.

In some embodiments, each of the first unit pattern, the second unit pattern, the third unit pattern, and the fourth unit pattern is a $(2n)^2$ pixel array, where n is an integer greater than or equal to 2.

In some embodiments, the solid-state image sensor further includes a first insert pixel array disposed between the first unit pattern and the second unit pattern. The first insert pixel array overlaps the first axis of symmetry.

In some embodiments, the first insert pixel array is also disposed between the third unit pattern and the fourth unit pattern.

In some embodiments, the number of columns in the first insert pixel array is n.

In some embodiments, the first insert pixel array presents colors that correspond to colors presented in a first column of the first unit pattern and the third unit pattern.

In some embodiments, the solid-state image sensor further includes a second insert pixel array disposed between the first unit pattern and the third unit pattern. The second insert pixel array overlaps the second axis of symmetry.

In some embodiments, the second insert pixel array is also disposed between the second unit pattern and the fourth unit pattern.

In some embodiments, the number of rows in the second insert pixel array is n.

In some embodiments, the second insert pixel array presents colors that correspond to colors presented in a first row of the first unit pattern and the second unit pattern.

In some embodiments, the auto-focus pixel array is a p×q pixel array, where p and q are integers less than 2n.

In some embodiments, there is more than one auto-focus pixel array in each of the first unit pattern, the second unit pattern, the third unit pattern, and the fourth unit pattern.

In some embodiments, the normal pixels includes first color pixels and second color pixels, the first color pixels are disposed in at least one $n^2$ pixel array, and the second color pixels are disposed in at least one $n^2$ pixel array.

In some embodiments, the first unit pattern and the second unit pattern are located on opposite sides of a light source.

In some embodiments, the normal pixels comprise red color filters, green color filters, blue color filters, yellow color filters, white color filters, cyan color filters, magenta color filters, or IR/NIR color filters.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

FIGS. 3A-3H are different examples of the first unit pattern.

FIGS. 6A-6H are different examples of the first unit pattern.

DETAILED DESCRIPTION

Figure 1:
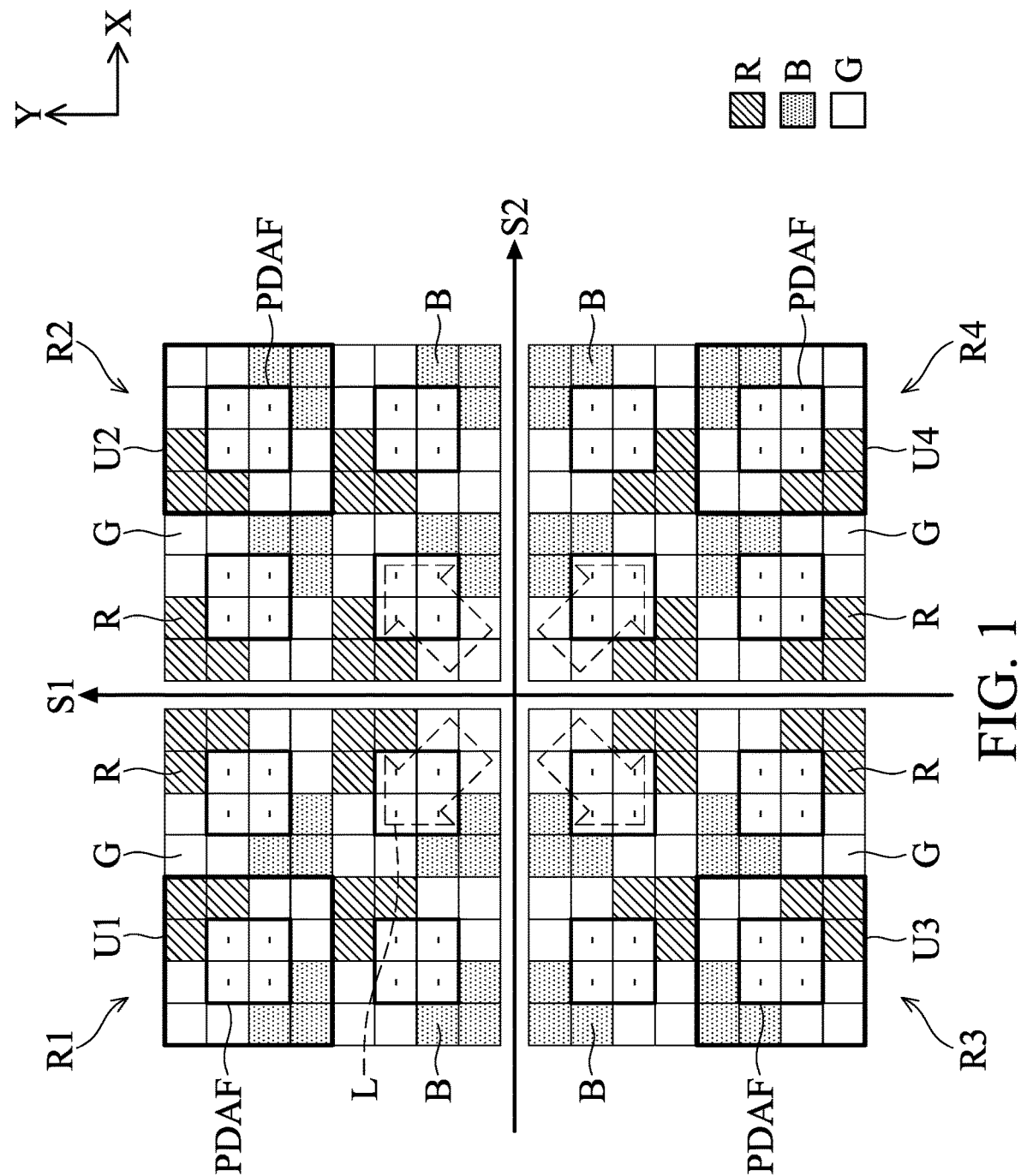
FIG. 1 is a partial top view illustrating the solid-state image sensor in accordance with some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

Furthermore, spatially relative terms, such as "beneath," "below," "lower," "on." "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a partial top view illustrating the solid-state image sensor 100 in accordance with some embodiments of the present disclosure. In more detail, FIG. 1 shows the pixel arrangement of the solid-state image sensor 100.

Referring to FIG. 1, in some embodiments, the solid-state image sensor 100 has (or is divided into) a first region R1 and a second region R2 adjacent to the first region R1 along X-direction. Moreover, as show in FIG. 1, in some embodiments, the solid-state image sensor 100 also has (or is further divided into) a third region R3 adjacent to the first region R1 along Y-direction that is perpendicular to X-direction, and a fourth region R4 adjacent to the second region R2 along Y-direction.

Referring to FIG. 1, in some embodiments, the solid-state image sensor 100 includes first unit patterns U1 disposed in the first region R1. For example, there are four first unit patterns U1 in the first region R1, but the present disclosure is not limited thereto. It should be noted that the number of first unit patterns U1 in the first region R1 may be changed according to actual needs.

Referring to FIG. 1, in some embodiments, the solid-state image sensor 100 includes second unit patterns U2 disposed in the second region R2 and corresponding to the first unit patterns U1. That is, there are four second unit patterns U2 in the second region R2, but the present disclosure is not limited thereto. It should be noted that the number of first unit patterns U1 in the first region R1 and the number of second unit patterns U2 in the second region R2 are the same.

Referring to FIG. 1, in some embodiments, each first unit pattern U1 and each second unit pattern U2 include normal pixels (e.g., pixel R, pixel G, or pixel B) and an auto-focus pixel array PDAF. In some embodiments, the normal pixels receive at least two different colors. That is, the normal pixels may include at least two different color filters. In other words, the normal pixels include at least two different color pixels that may be disposed adjacent to each other.

In some embodiments, the normal pixels include red color filters, so that pixels R receive red light; the normal pixels also include green color filters, so that pixels G receive green light; the normal pixels further include blue color filters, so that pixels B receive blue light. In some other embodiments, the normal pixels include yellow color filters, white color filters, cyan color filters, magenta color filters, or IR/NIR color filters.

Referring to FIG. 1, in some embodiments, the normal pixels (e.g., pixel R, pixel G, or pixel B) and the auto-focus pixel array PDAF in the first unit pattern U1 form a first arrangement, the normal pixels (e.g., pixel R, pixel G, or pixel B) and the auto-focus pixel array PDAF in the second unit pattern U2 form a second arrangement, and the first arrangement and the second arrangement are symmetric with respect to the first axis of symmetry S1.

For example, as shown in FIG. 1, each first unit pattern U1 is a 4×4 pixel array, each second unit pattern U2 is a 4.4 pixel array, pixel G, pixel G, pixel B, and pixel B are arranged in sequence from top to bottom in the first column of the first unit pattern U1 and in the fourth column of the corresponding second unit pattern U2, and pixel R, pixel R, pixel G, and pixel G are arranged in sequence from top to bottom in the fourth column of the first unit pattern U1 and in the first column of the corresponding second unit pattern U2. Moreover, pixel G, pixel G, pixel R, and pixel R are arranged in sequence from left to right in the first row of the first unit pattern U1, and pixel R, pixel R, pixel G, and pixel G are arranged in sequence from left to right in the first row of the corresponding second unit pattern U2; pixel B, pixel B, pixel G, and pixel G are arranged in sequence from left to right in the fourth row of the first unit pattern U1, and pixel G, pixel G, pixel B, and pixel B are arranged in sequence from left to right in the fourth row of the corresponding second unit pattern U2. Furthermore, the auto-focus pixel array PDAF is a 2×2 pixel array and disposed on the center of the first unit pattern U1 and the second unit pattern U2. However, the present disclosure is not limited thereto.

As shown in FIG. 1, in some embodiments, the solid-state image sensor 100 also includes third unit patterns U3 disposed in the third region R3 and corresponding to the first unit patterns U1. That is, there are four third unit patterns U3 in the third region R3, but the present disclosure is not limited thereto. It should be noted that the number of first unit patterns U1 in the first region R1 and the number of third unit patterns U3 in the third region R3 are the same. Similarly, each third unit pattern U3 includes normal pixels (e.g., pixel R, pixel G, or pixel B) and an auto-focus pixel array PDAF.

As shown in FIG. 1, in some embodiments, the normal pixels (e.g., pixel R, pixel G, or pixel B) and the auto-focus pixel array PDAF in the third unit pattern U3 form a third arrangement, and the first arrangement and the third arrangement are symmetric with respect to the second axis of symmetry S2, which is perpendicular to the first axis of symmetry S1.

For example, as shown in FIG. 1, each third unit pattern U3 is a 4×4 pixel array, pixel G, pixel G, pixel B, and pixel B are arranged in sequence from top to bottom in the first column of the first unit pattern U1, and pixel B, pixel B, pixel G, and pixel G are arranged in sequence from top to bottom in the first column of the corresponding third unit pattern U3; pixel R, pixel R, pixel G, and pixel G are arranged in sequence from top to bottom in the fourth column of the first unit pattern U1, and pixel G, pixel G, pixel R, and pixel R are arranged in sequence from top to bottom in the fourth column of the corresponding third unit pattern U3. Moreover, pixel G, pixel G, pixel R, and pixel R are arranged in sequence from left to right in the first row of the first unit pattern U1 and in the fourth row of the corresponding third unit pattern U3, and pixel B, pixel B, pixel G, and pixel G are arranged in sequence from left to right in the fourth row of the first unit pattern U1 and in the first row of the corresponding third unit pattern U3. Similarly, the auto-focus pixel array PDAF is a 2×2 pixel array and disposed on the center of the third unit pattern U3. However, the present disclosure is not limited thereto.

As shown in FIG. 1, in some embodiments, the solid-state image sensor 100 further includes fourth unit patterns U4 disposed in the fourth region R4 and corresponding to the second unit patterns U2. That is, there are four fourth unit patterns U4 in the fourth region R4, but the present disclosure is not limited thereto. It should be noted that the number of second unit patterns U2 in the second region R2 and the number of fourth unit patterns U4 in the fourth region R4 are the same. Similarly, each fourth unit pattern U4 includes normal pixels (e.g., pixel R, pixel G, or pixel B) and an auto-focus pixel array PDAF.

As shown in FIG. 1, in some embodiments, the normal pixels (e.g., pixel R, pixel G, or pixel B) and the auto-focus pixel array PDAF in the fourth unit pattern U4 form a fourth arrangement, and the second arrangement and the fourth arrangement are symmetric with respect to the second axis of symmetry S2. Alternately, the third arrangement and the fourth arrangement are symmetric with respect to the first axis of symmetry S1.

For example, as shown in FIG. 1, each fourth unit pattern U3 is a 4×4 pixel array, pixel R, pixel R, pixel G, and pixel G are arranged in sequence from top to bottom in the first column of the second unit pattern U2, and pixel G, pixel G, pixel R, and pixel R are arranged in sequence from top to bottom in the first column of the corresponding fourth unit pattern U4; pixel G, pixel G, pixel B, and pixel B are arranged in sequence from top to bottom in the fourth column of the second unit pattern U2, and pixel B, pixel B, pixel G, and pixel G are arranged in sequence from top to bottom in the fourth column of the corresponding fourth unit pattern U4. Moreover, pixel R, pixel R, pixel G, and pixel G are arranged in sequence from left to right in the first row of the second unit pattern U2 and in the fourth row of the corresponding fourth unit pattern U4, and pixel G, pixel G, pixel B, and pixel B are arranged in sequence from left to right in the fourth row of the second unit pattern U2 and in the first row of the corresponding fourth unit pattern U4. Similarly, the auto-focus pixel array PDAF is a 2×2 pixel array and disposed on the center of the fourth unit pattern U4. However, the present disclosure is not limited thereto.

In more detail, a light source (not shown) may be disposed on the center of the solid-state image sensor 100 and emit lights L as shown in FIG. 1. In this embodiment, the first unit pattern U1 and the third unit pattern U3 are disposed substantially on the left side of the solid-state image sensor 100 (or the light source), and the second unit pattern U2 and the fourth unit pattern U4 are disposed substantially on the right side of the solid-state image sensor 100 (or the light source). On the other hand, the first unit pattern U1 and the second unit pattern U2 are disposed substantially on the upper side of the solid-state image sensor 100 (or the light source), and the third unit pattern U3 and the fourth unit pattern U4 are disposed substantially on the lower side of the solid-state image sensor 100 (or the light source). Since the solid-state image sensor 100 has aforementioned symmetrical pattern design, patterns on opposite sides (e.g., left side and right side, or upper side and lower side) don't need to adopt different and complicated image signal processing (ISP) (signal compensation), which may effectively simplify the image signal processing (signal compensation).

As shown in FIG. 1, each the unit pattern (e.g., the first unit pattern U1, the second unit pattern U2, the third unit pattern U3, or the fourth unit pattern U4) is a 4×4 pixel array, and the auto-focus pixel array PDAF is a 2×2 pixel array, but the present disclosure is not limited thereto. In some embodiments, each the unit pattern (e.g., the first unit pattern U1, the second unit pattern U2, the third unit pattern U3, or the fourth unit pattern U4) is a $(2n)^2$ pixel array, where n is an integer greater than or equal to 2. In some embodiments, the auto-focus pixel array PDAF is a p×q pixel array, where p and q are integers less than 2n.

Moreover, as shown in FIG. 1, in each unit pattern (e.g., the first unit pattern U1, the second unit pattern U2, the third unit pattern U3, or the fourth unit pattern U4), pixels R are disposed in one 2×2 pixel array, pixels G are disposed in two 2×2 pixel arrays, and pixels B are disposed in one 2×2 pixel array. That is, in some embodiments, the color pixels are disposed in at least one $n^2$ pixel array, where n is an integer greater than or equal to 2.

Figure 2:
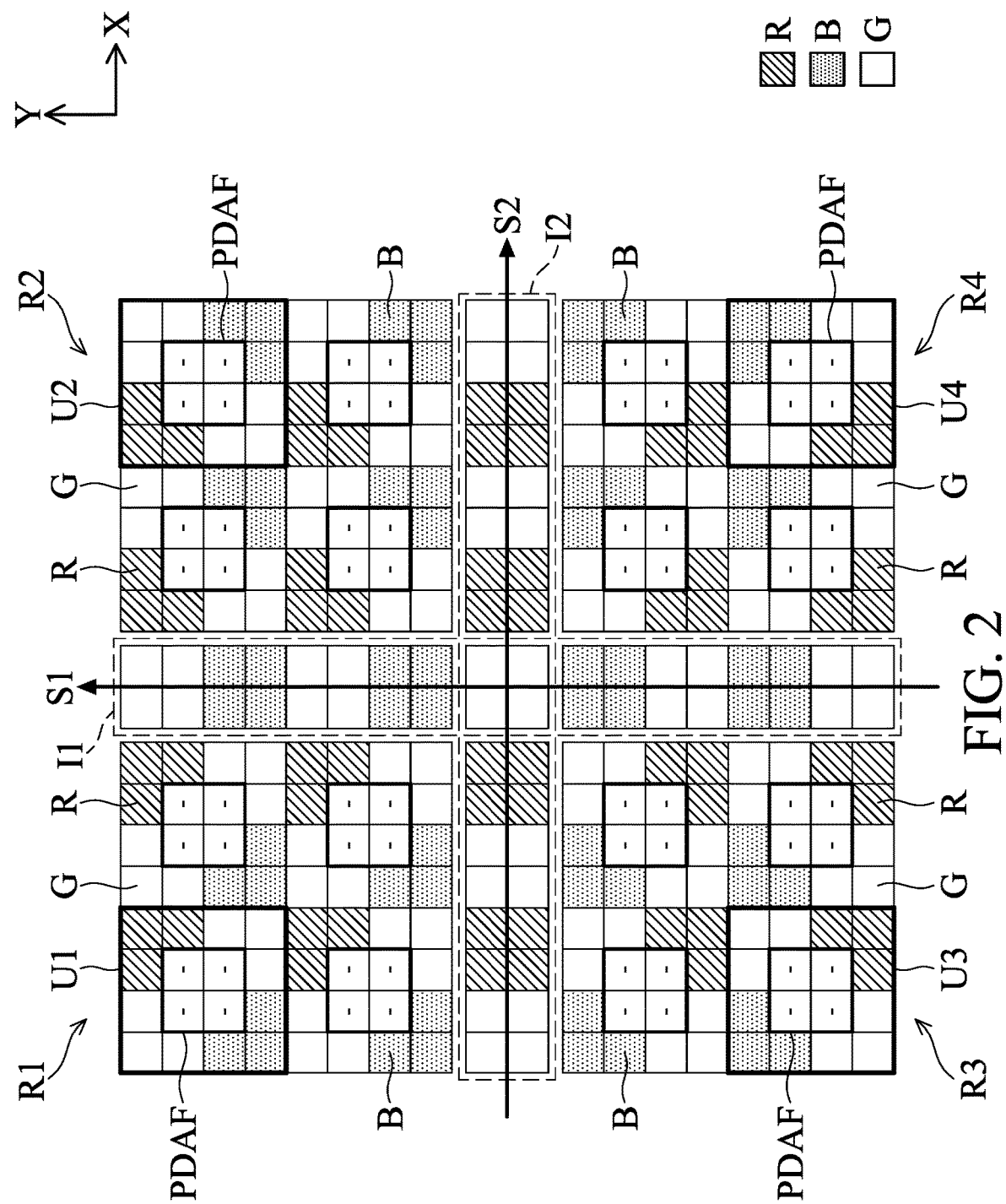
FIG. 2 is a partial top view illustrating the solid-state image sensor in accordance with some other embodiments of the present disclosure.

FIG. 2 is a partial top view illustrating the solid-state image sensor 102 in accordance with some other embodiments of the present disclosure. In more detail, FIG. 2 shows the pixel arrangement of the solid-state image sensor 102.

The solid-state image sensor 102 has a structure similar to the solid-state image sensor 100 shown in FIG. 1. That is, the solid-state image sensor 102 has (or is divided into) a first region R1, a second region R2 adjacent to the first region R1 along X-direction, a third region R3 adjacent to the first region R1 along Y-direction that is perpendicular to X-direction, and a fourth region R4 adjacent to the second region R2 along Y-direction.

Moreover, the solid-state image sensor 102 includes first unit patterns U1 disposed in the first region R1, second unit patterns U2 disposed in the second region R2 and corresponding to the first unit patterns U1, third unit patterns U3 disposed in the third region R3 and corresponding to the first unit patterns U1, and fourth unit patterns U4 disposed in the fourth region R4 and corresponding to the second unit patterns U2.

As shown in FIG. 2, the normal pixels (e.g., pixel R, pixel G, or pixel B) and the auto-focus pixel array PDAF in the first unit pattern U1 form a first arrangement, the normal pixels (e.g., pixel R, pixel G, or pixel B) and the auto-focus pixel array PDAF in the second unit pattern forms U2 form a second arrangement, the normal pixels (e.g., pixel R, pixel G, or pixel B) and the auto-focus pixel array PDAF in the third unit pattern U3 form a third arrangement, and the normal pixels (e.g., pixel R, pixel G, or pixel B) and the auto-focus pixel array PDAF in the fourth unit pattern U4 form a fourth arrangement. In some embodiments, the first arrangement and the second arrangement are symmetric with respect to the first axis of symmetry S1, the first arrangement and the third arrangement are symmetric with respect to the second axis of symmetry S2, and the second arrangement and the fourth arrangement are symmetric with respect to the second axis of symmetry S2 (or the third arrangement and the fourth arrangement are symmetric with respect to the first axis of symmetry S1).

Referring to FIG. 2, in some embodiments, the solid-state image sensor 102 includes a first insert pixel array I1 disposed between the first unit patterns U1 and the second unit patterns U2. As shown in FIG. 2, in some embodiments, the first insert pixel array I1 is also disposed between the third unit patterns U3 and the fourth unit patterns U4. Moreover, in some embodiments, the first insert pixel array I1 overlaps the first axis of symmetry S1 as shown in FIG. 2.

In some embodiments, each unit pattern (e.g., the first unit pattern U1, the second unit pattern U2, the third unit pattern U3, or the fourth unit pattern U4) is a $(2n)^2$ pixel array, where n is an integer greater than or equal to 2, and the number of columns in the first insert pixel array I1 is n. For example, as shown in FIG. 2, each unit pattern (e.g., the first unit pattern U1, the second unit pattern U2, the third unit pattern U3, or the fourth unit pattern U4) may be a 4×4 pixel array, and the number of columns in the first insert pixel array I1 may be 2, but the present disclosure is not limited thereto.

As shown in FIG. 2, in some embodiments, the first insert pixel array I1 presents colors that correspond to colors presented in the first column of the first unit patterns U1 and the third unit patterns U3. In other words, the first insert pixel array I1 presents colors that correspond to colors presented in the last column (the fourth column in the embodiment shown in FIG. 2) of the second unit patterns U2 and the fourth unit patterns U4.

Referring to FIG. 2, in some embodiments, the solid-state image sensor 102 also includes a second insert pixel array I2 disposed between the first unit patterns U1 and the third unit patterns U3. As shown in FIG. 2, in some embodiments, the second insert pixel array I2 is also disposed between the second unit patterns U2 and the fourth unit patterns U4. Moreover, in some embodiments, the second insert pixel array I2 overlaps the second axis of symmetry S2 as shown in FIG. 2.

In some embodiments, each unit pattern (e.g., the first unit pattern U1, the second unit pattern U2, the third unit pattern U3, or the fourth unit pattern U4) is a $(2n)^2$ pixel array, where n is an integer greater than or equal to 2, and the number of rows in the second insert pixel array I2 is n. For example, as shown in FIG. 2, each unit pattern (e.g., the first unit pattern U1, the second unit pattern U2, the third unit pattern U3, or the fourth unit pattern U4) may be a 4×4 pixel array, and the number of rows in the second insert pixel array I2 may be 2, but the present disclosure is not limited thereto.

As shown in FIG. 2, in some embodiments, the second insert pixel array I2 presents colors that correspond to colors presented in the first row of the first unit patterns U1 and the second unit patterns U2. In other words, the second insert pixel array I2 presents colors that correspond to colors presented in the last row (the fourth row in the embodiment shown in FIG. 2) of the third unit patterns U3 and the fourth unit patterns U4.

In the embodiment shown in FIG. 2, the first insert pixel array I1 disposed between the first unit patterns U1 and the second unit patterns U2 (or between the third unit patterns U3 and the fourth unit patterns U4) and the second insert pixel array I2 disposed between the first unit patterns U1 and the third unit patterns U3 (or between the second unit patterns U2 and the fourth unit patterns U4) may further improve the resolution drop in the solid-state image sensor 102.

In the foregoing embodiments, the auto-focus pixel array PDAF is a 2×2 pixel array and disposed on the center of each unit pattern, but the present disclosure is not limited thereto.

FIGS. 3A-3H are different examples of the first unit pattern U1. Each of the first unit patterns U1 shown in FIGS. 3A-3H may be used to replace the first unit pattern U1 shown in FIG. 1 or FIG. 2, but the present disclosure is not limited thereto.

It should be noted that the second unit pattern U2, the third unit pattern U3, and the fourth unit pattern U4 are adjusted according to the first unit pattern U1. That is, the arrangement of the normal pixels (e.g., pixel R, pixel G, or pixel B) and the auto-focus pixel array PDAF in the second unit pattern U2, the third unit pattern U3, and the fourth unit pattern U4 may be changed according to the arrangement of the normal pixels (e.g., pixel R, pixel G, or pixel B) and the auto-focus pixel array PDAF in the first unit pattern U1. Furthermore, FIGS. 3A-3H may also be different examples of the second unit pattern U2, the third unit pattern U3, or the fourth unit pattern U4.

Figure 3A:
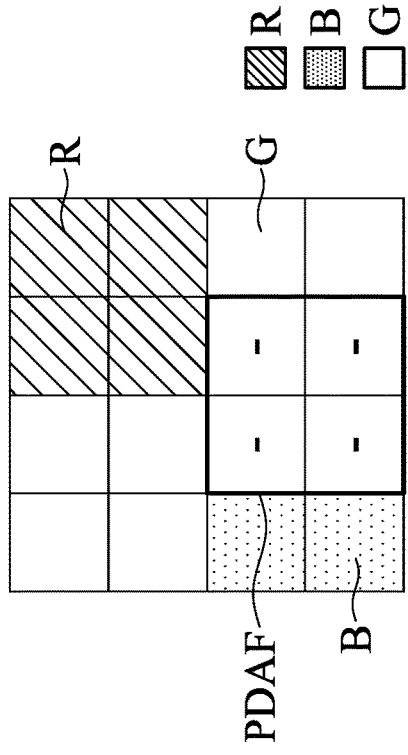
Figure 3B:
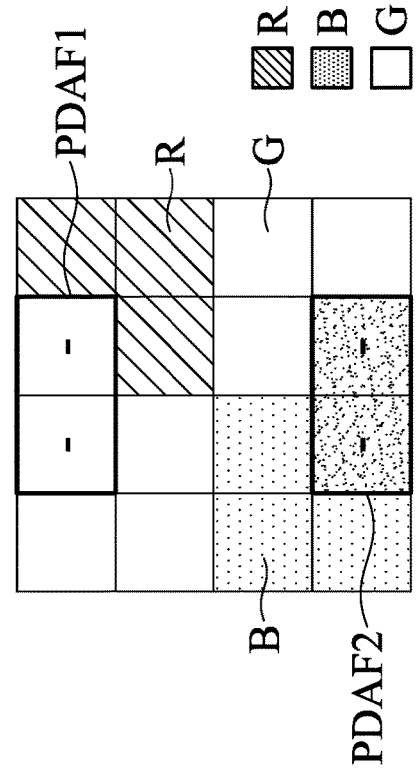
Figure 3C:
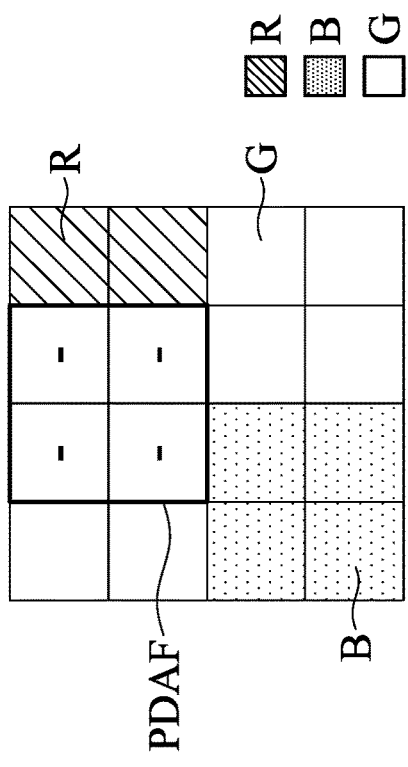
Figure 3D:
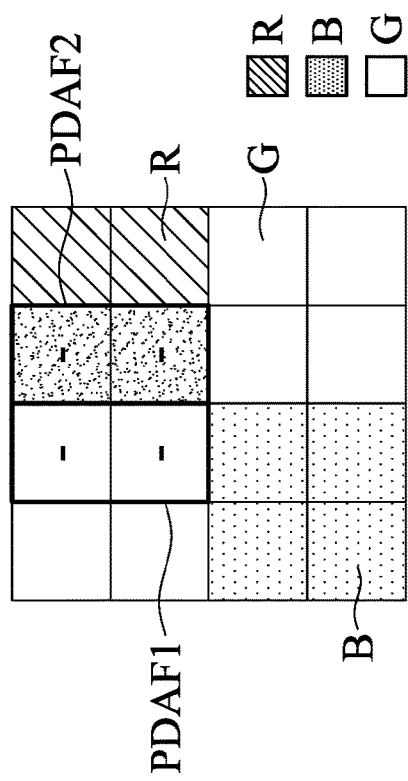

As shown in FIG. 3A and FIG. 3B, the auto-focus pixel array PDAF is a 2×2 pixel array, but the auto-focus pixel array PDAF is not disposed on the center of the first unit pattern U1. As shown in FIG. 3C and FIG. 3D, there are two auto-focus pixel arrays (i.e., the auto-focus pixel array PDAF1 and the auto-focus pixel array PDAF2) in each first unit pattern U1. For example, the auto-focus pixel array PDAF1 and the auto-focus pixel array PDAF2 are 2×1 pixel arrays (or 1×2 pixel arrays) that are adjacent to each other or separated from each other.

As shown in FIG. 3E, FIG. 3F, FIG. 3F, and FIG. 3H, the auto-focus pixel arrays PDAF are 2×1 pixel arrays (or 1×2 pixel arrays) that are disposed on different locations in the first unit pattern U1. It should be noted that the number of columns and rows in each auto-focus pixel array (PDAF, PDAF1 or PDAF2), and the number of auto-focus pixel arrays in one first unit pattern U1 are not limited to the forgoing examples, and they may be adjusted according to actual need.

Figure 4:
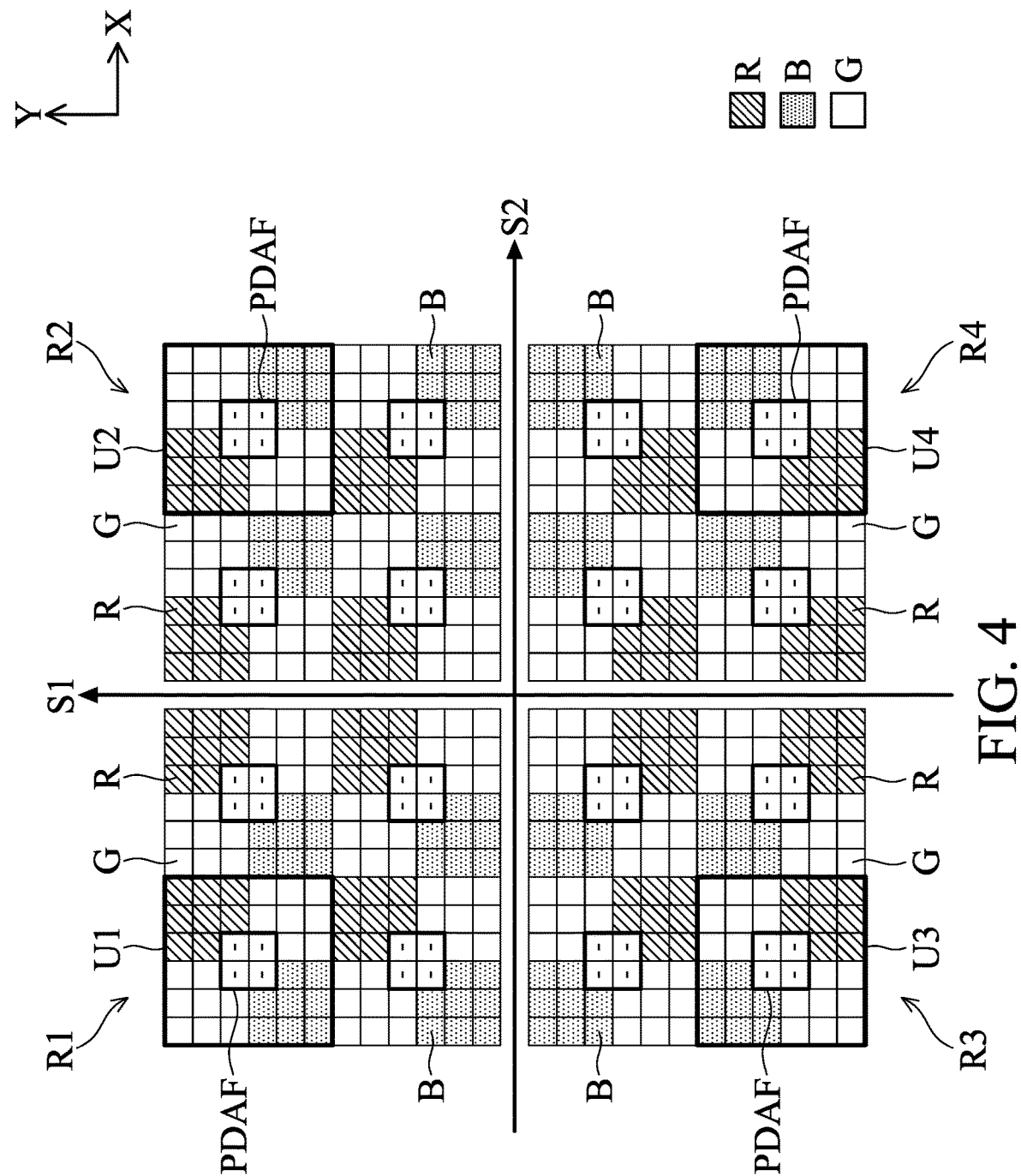
FIG. 4 is a partial top view illustrating the solid-state image sensor in accordance with some embodiments of the present disclosure.

FIG. 4 is a partial top view illustrating the solid-state image sensor 104 in accordance with some embodiments of the present disclosure. In more detail, FIG. 4 shows the pixel arrangement of the solid-state image sensor 104.

The solid-state image sensor 104 has a structure similar to the solid-state image sensor 100 shown in FIG. 1. As shown in FIG. 4, each unit pattern (e.g., the first unit pattern U1, the second unit pattern U2, the third unit pattern U3, or the fourth unit pattern U4) is a 6×6 pixel array, and the auto-focus pixel array PDAF is a 2×2 pixel array, but the present disclosure is not limited thereto.

Moreover, as shown in FIG. 4, in each unit pattern (the first unit pattern U1, the second unit pattern U2, the third unit pattern U3, or the fourth unit pattern U4), pixels R are disposed in one 3×3 pixel array, pixels G are disposed in two 3×3 pixel arrays, and pixels B are disposed in one 3×3 pixel array, but the present disclosure is not limited thereto.

Figure 5:
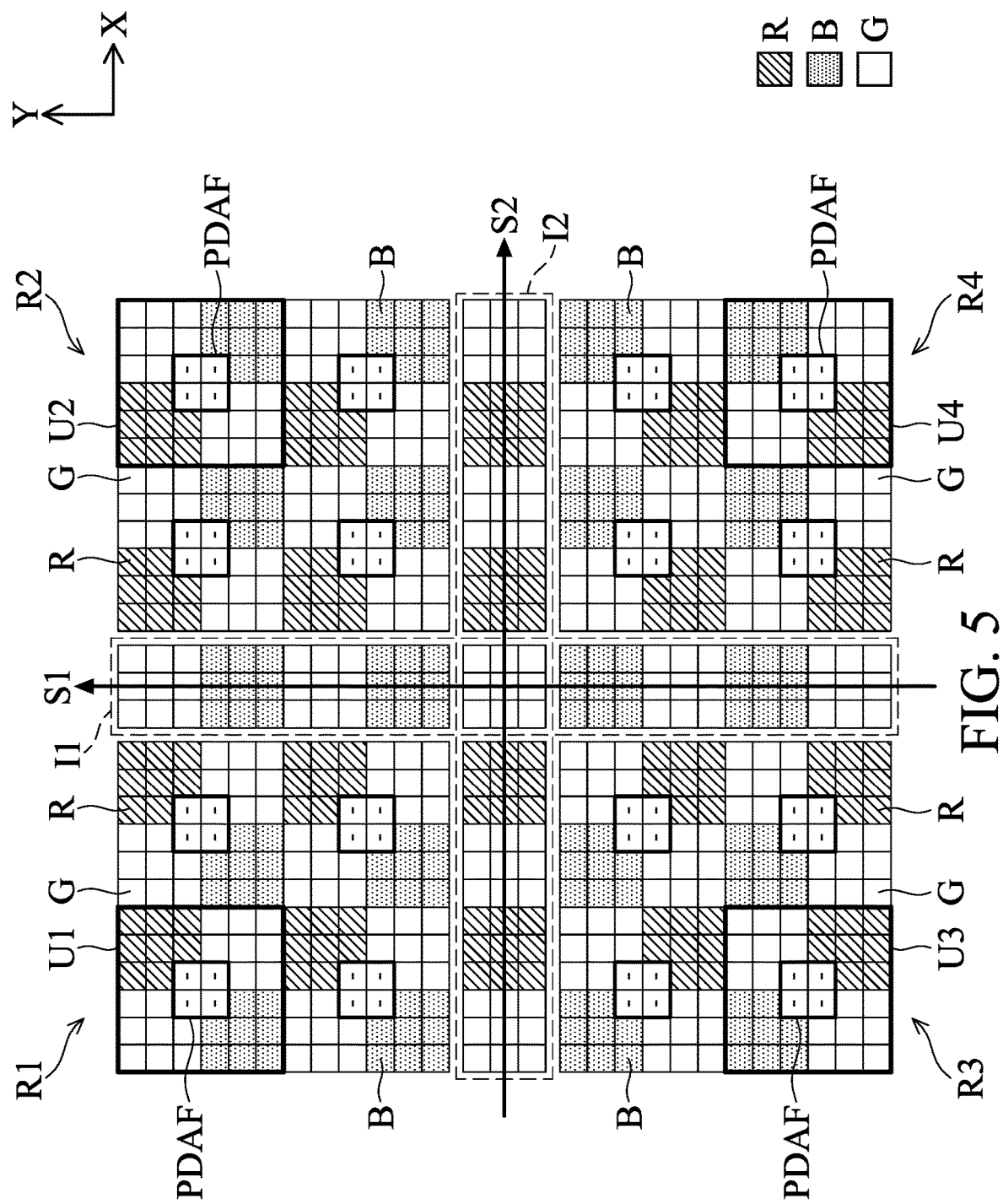
FIG. 5 is a partial top view illustrating the solid-state image sensor in accordance with some other embodiments of the present disclosure.

FIG. 5 is a partial top view illustrating the solid-state image sensor 106 in accordance with some other embodiments of the present disclosure. In more detail, FIG. 5 shows the pixel arrangement of the solid-state image sensor 106.

The solid-state image sensor 106 has a structure similar to the solid-state image sensor 104 shown in FIG. 4. Referring to FIG. 5, in some embodiments, the solid-state image sensor 106 includes a first insert pixel array I1 disposed between the first unit patterns U1 and the second unit patterns U2. As shown in FIG. 5, in some embodiments, the first insert pixel array I1 is also disposed between the third unit patterns U3 and the fourth unit patterns U4. Moreover, in some embodiments, the first insert pixel array I1 overlaps the first axis of symmetry S1 as shown in FIG. 5.

As shown in FIG. 5, each unit pattern (e.g., the first unit pattern U1, the second unit pattern U2, the third unit pattern U3, or the fourth unit pattern U4) may be a 6×6 pixel array, and the number of columns in the first insert pixel array I1 may be 3, but the present disclosure is not limited thereto.

As shown in FIG. 5, in some embodiments, the first insert pixel array I1 presents colors that correspond to colors presented in the first column of the first unit patterns U1 and the third unit patterns U3. In other words, the first insert pixel array I1 presents colors that correspond to colors presented in the last column (the sixth column in the embodiment shown in FIG. 5) of the second unit patterns U2 and the fourth unit patterns U4.

Referring to FIG. 5, in some embodiments, the solid-state image sensor 106 also includes a second insert pixel array I2 disposed between the first unit patterns U1 and the third unit patterns U3. As shown in FIG. 5, in some embodiments, the second insert pixel array I2 is also disposed between the second unit patterns U2 and the fourth unit patterns U4. Moreover, in some embodiments, the second insert pixel array I2 overlaps the second axis of symmetry S2 as shown in FIG. 5.

As shown in FIG. 5, each unit pattern (e.g., the first unit pattern U1, the second unit pattern U2, the third unit pattern U3, or the fourth unit pattern U4) may be a 6×6 pixel array, and the number of rows in the second insert pixel array I2 may be 3, but the present disclosure is not limited thereto.

As shown in FIG. 5, in some embodiments, the second insert pixel array I2 presents colors that correspond to colors presented in the first row of the first unit patterns U1 and the second unit patterns U2. In other words, the second insert pixel array I2 presents colors that correspond to colors presented in the last row (the sixth row in the embodiment shown in FIG. 5) of the third unit patterns U3 and the fourth unit patterns U4.

FIGS. 6A-6H are different examples of the first unit pattern U1. Each of the first unit patterns U1 shown in FIGS. 6A-6H may be used to replace the first unit pattern U1 shown in FIG. 4 or FIG. 5, but the present disclosure is not limited thereto.

It should be noted that the second unit pattern U2, the third unit pattern U3, and the fourth unit pattern U4 are adjusted according to the first unit pattern U1. That is, the arrangement of the normal pixels (e.g., pixel R, pixel G, or pixel B) and the auto-focus pixel array PDAF in the second unit pattern U2, the third unit pattern U3, and the fourth unit pattern U4 may be changed according to the arrangement of the normal pixels (e.g., pixel R, pixel G, or pixel B) and the auto-focus pixel array PDAF in the first unit pattern U1. Furthermore, FIGS. 6A-6H may also be different examples of the second unit pattern U2, the third unit pattern U3, or the fourth unit pattern U4.

Figures 6A, 6B, 6C, 6D:
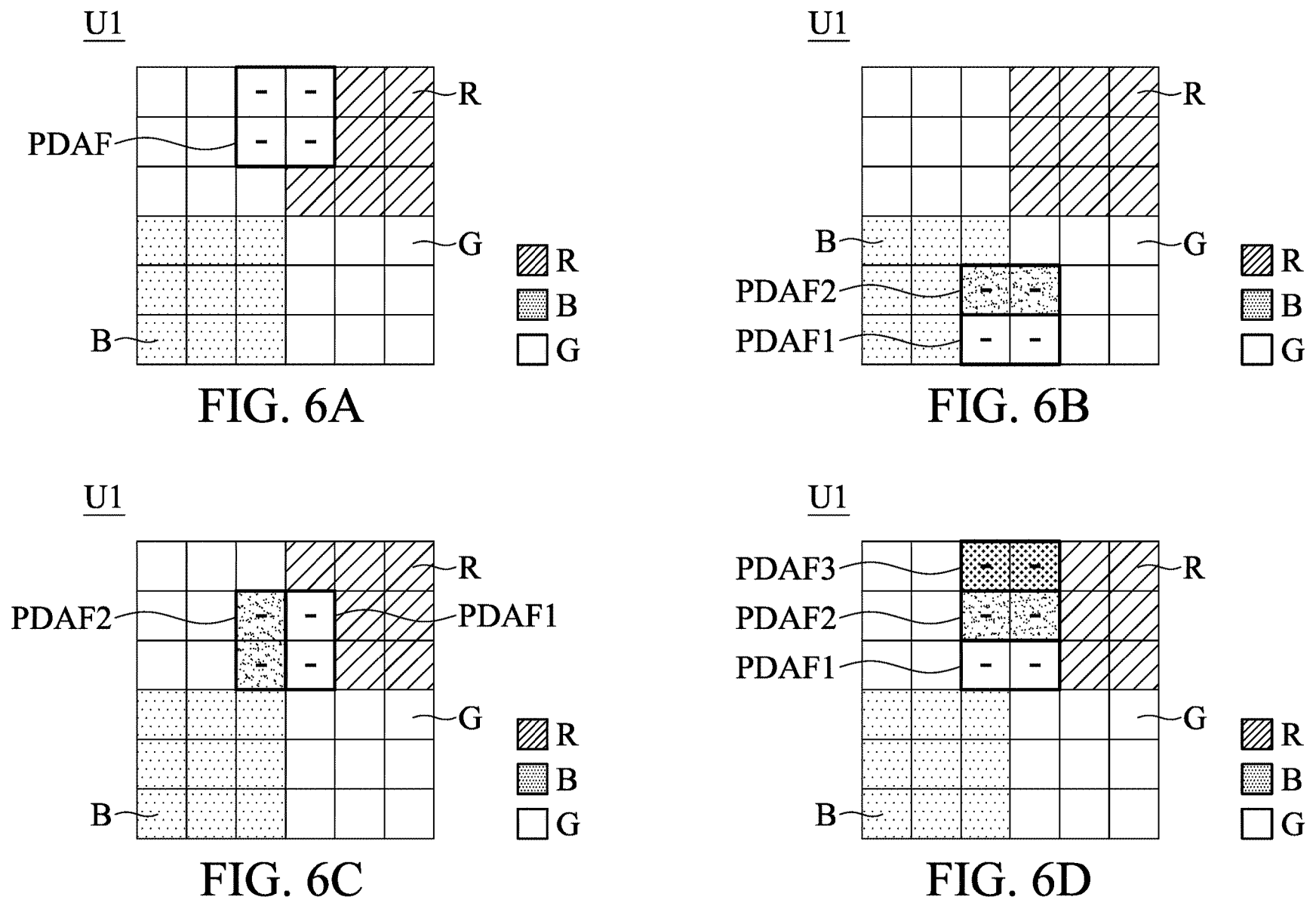

As shown in FIG. 6A, the auto-focus pixel array PDAF is a 2×2 pixel array, but the auto-focus pixel array PDAF is not disposed on the center of the first unit pattern U1. As shown in FIG. 6B and FIG. 6C, there are two auto-focus pixel arrays (i.e., the auto-focus pixel array PDAF1 and the auto-focus pixel array PDAF2) in each first unit pattern U1. For example, the auto-focus pixel array PDAF1 and the auto-focus pixel array PDAF2 may be 2×1 pixel arrays (or 1×2 pixel arrays) that are adjacent to each other. As shown in FIG. 6D, there are three auto-focus pixel arrays (i.e., the auto-focus pixel array PDAF1, the auto-focus pixel array PDAF2, and the auto-focus pixel array PDAF3) in each first unit pattern U1. For example, the auto-focus pixel array PDAF1, the auto-focus pixel array PDAF2, and the auto-focus pixel array PDAF3 may be 2×1 pixel arrays (or 1×2 pixel arrays) that are adjacent to each other.

Figure 6E:
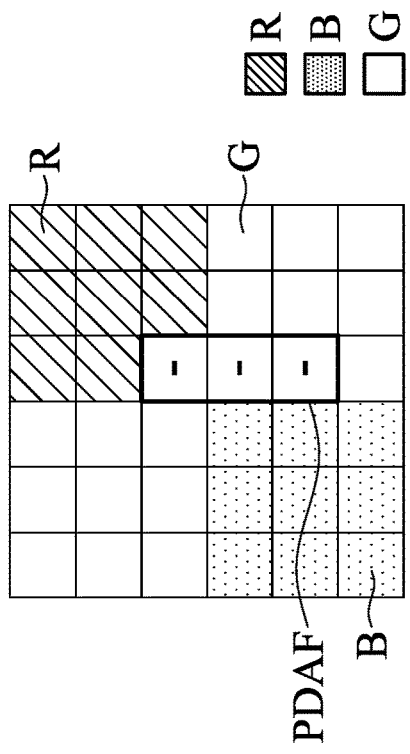
Figure 6F:
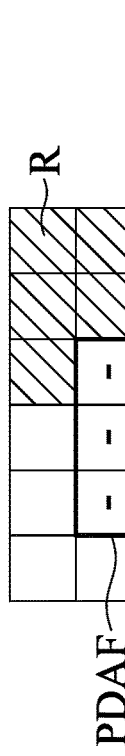
Figure 6G:
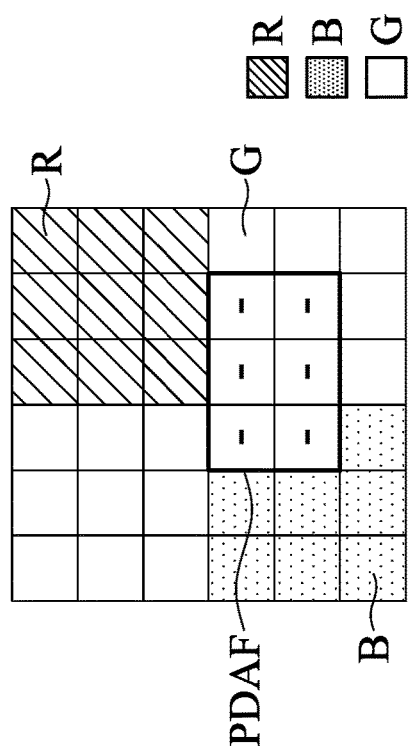
Figure 6H:
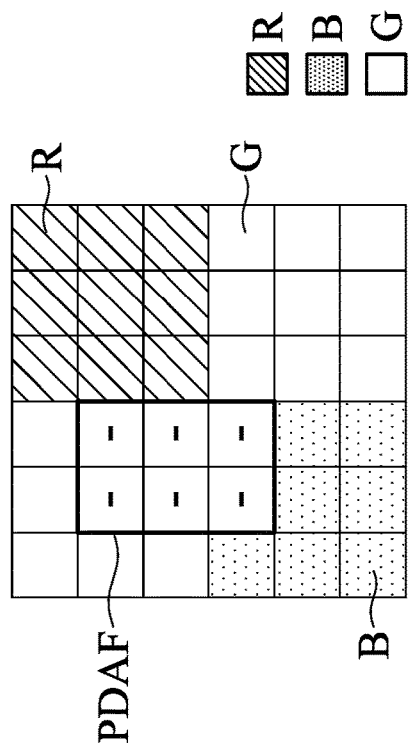

As shown in FIG. 6E and FIG. 6F, the auto-focus pixel array PDAF is a 1×3 pixel array (or 3×1 pixel array) that is not disposed on the center of the first unit pattern U1. As shown in FIG. 6G and FIG. 6H, the auto-focus pixel array PDAF is a 2×3 pixel array (or 3×2 pixel array) that is not disposed on the center of the first unit pattern U1. It should be noted that the number of columns and rows in each auto-focus pixel array (PDAF, PDAF1, PDAF2, or PDAF3), and the number of auto-focus pixel arrays in one first unit pattern U1 are not limited to the forgoing examples, and they may be adjusted according to actual need.

Figure 7:
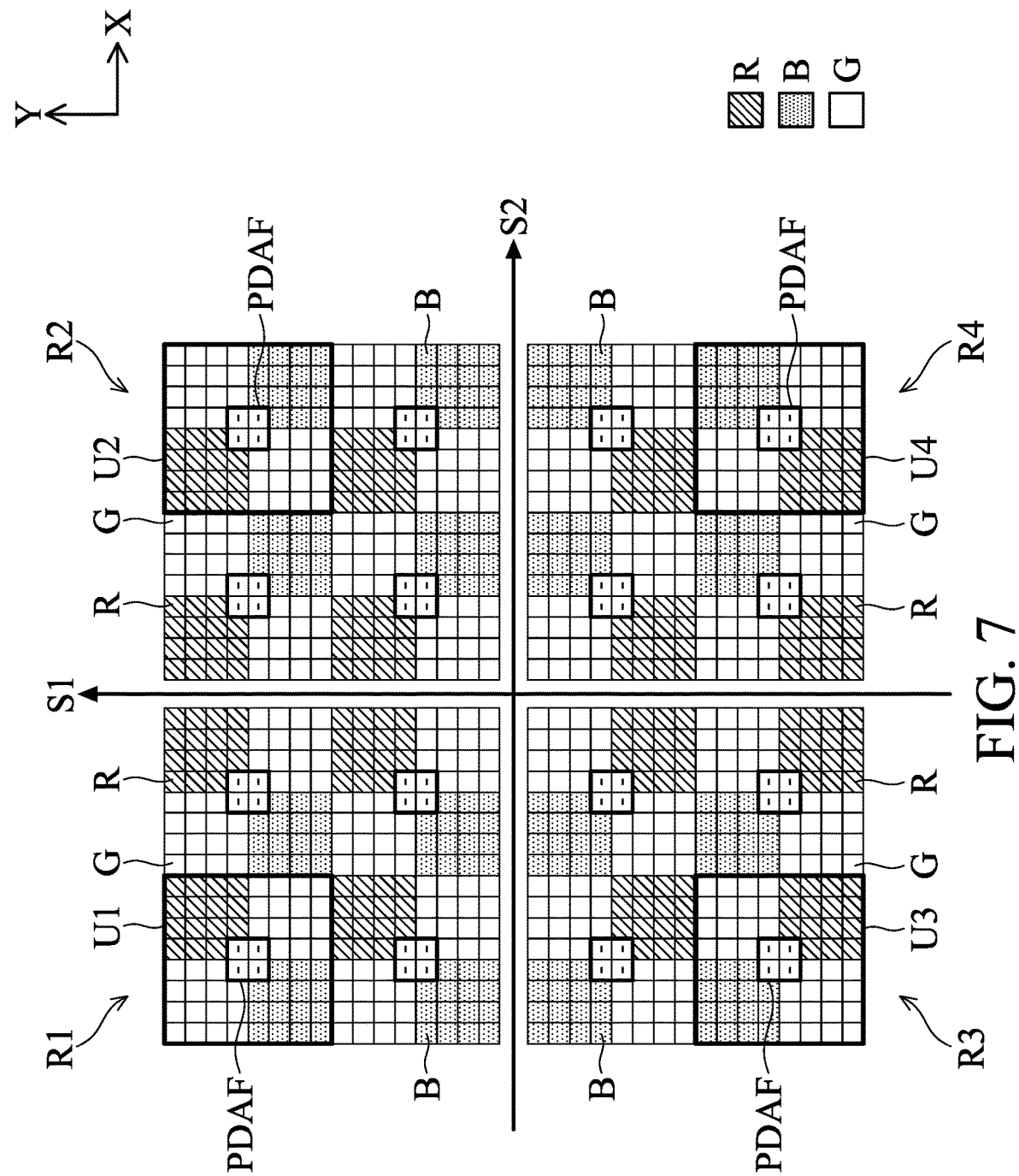
FIG. 7 is a partial top view illustrating the solid-state image sensor in accordance with some embodiments of the present disclosure.

FIG. 7 is a partial top view illustrating the solid-state image sensor 108 in accordance with some embodiments of the present disclosure. In more detail, FIG. 7 shows the pixel arrangement of the solid-state image sensor 108.

The solid-state image sensor 108 has a structure similar to the solid-state image sensor 100 shown in FIG. 1. Referring to FIG. 7, each unit pattern (e.g., the first unit pattern U1, the second unit pattern U2, the third unit pattern U3, or the fourth unit pattern U4) is a 8×8 pixel array, and the auto-focus pixel array PDAF is a 2×2 pixel array, but the present disclosure is not limited thereto.

Moreover, as shown in FIG. 7, in each unit pattern (e.g., the first unit pattern U1, the second unit pattern U2, the third unit pattern U3, or the fourth unit pattern U4), pixels R are disposed in one 4×4 pixel array, pixels G are disposed in two 4×4 pixel arrays, and pixels B are disposed in one 4×4 pixel array, but the present disclosure is not limited thereto.

Figure 8:
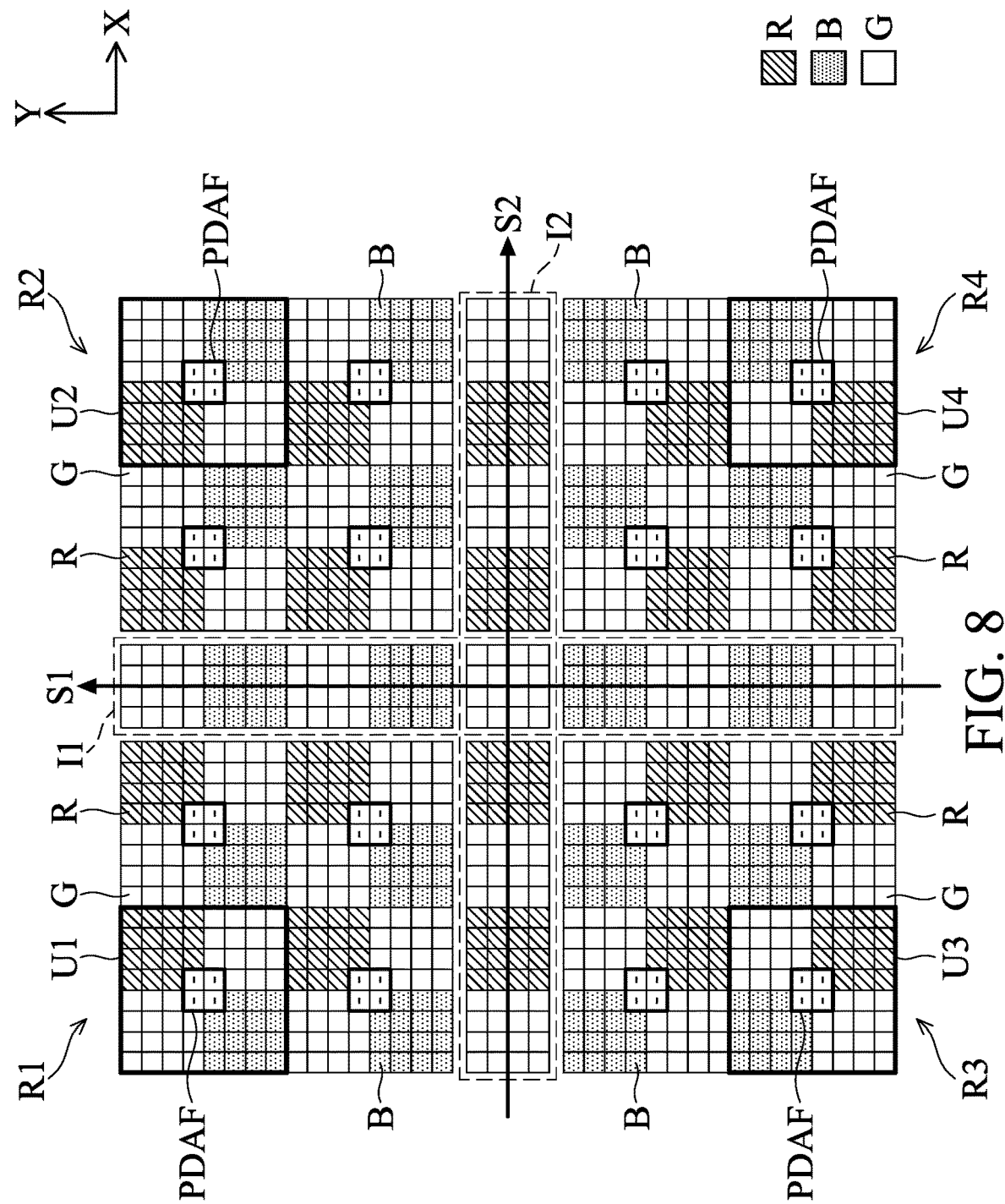
FIG. 8 is a partial top view illustrating the solid-state image sensor in accordance with some other embodiments of the present disclosure.

FIG. 8 is a partial top view illustrating the solid-state image sensor 110 in accordance with some other embodiments of the present disclosure. In more detail, FIG. 8 shows the pixel arrangement of the solid-state image sensor 110.

The solid-state image sensor 110 has a structure similar to the solid-state image sensor 108 shown in FIG. 7. Referring to FIG. 8, in some embodiments, the solid-state image sensor 110 includes a first insert pixel array I1 disposed between the first unit patterns U1 and the second unit patterns U2. As shown in FIG. 8, in some embodiments, the first insert pixel array I1 is also disposed between the third unit patterns U3 and the fourth unit patterns U4. Moreover, in some embodiments, the first insert pixel array I1 overlaps the first axis of symmetry S1 as shown in FIG. 8.

As shown in FIG. 8, each unit pattern (e.g., the first unit pattern U1, the second unit pattern U2, the third unit pattern U3, or the fourth unit pattern U4) may be a 8×8 pixel array, and the number of columns in the first insert pixel array I1 may be 4, but the present disclosure is not limited thereto.

As shown in FIG. 8, in some embodiments, the first insert pixel array I1 presents colors that correspond to colors presented in the first column of the first unit patterns U1 and the third unit patterns U3. In other words, the first insert pixel array I1 presents colors that correspond to colors presented in the last column (the eighth column in the embodiment shown in FIG. 8) of the second unit patterns U2 and the fourth unit patterns U4.

Referring to FIG. 8, in some embodiments, the solid-state image sensor 110 also includes a second insert pixel array I2 disposed between the first unit patterns U1 and the third unit patterns U3. As shown in FIG. 8, in some embodiments, the second insert pixel array I2 is also disposed between the second unit patterns U2 and the fourth unit patterns U4. Moreover, in some embodiments, the second insert pixel array I2 overlaps the second axis of symmetry S2 as shown in FIG. 8.

As shown in FIG. 8, each unit pattern (e.g., the first unit pattern U1, the second unit pattern U2, the third unit pattern U3, or the fourth unit pattern U4) may be a 8×8 pixel array, and the number of rows in the second insert pixel array I2 may be 4, but the present disclosure is not limited thereto.

As shown in FIG. 8, in some embodiments, the second insert pixel array I2 presents colors that correspond to colors presented in the first row of the first unit patterns U1 and the second unit patterns U2. In other words, the second insert pixel array I2 presents colors that correspond to colors presented in the last row (the eighth row in the embodiment shown in FIG. 8) of the third unit patterns U3 and the fourth unit patterns U4.

FIGS. 9A-9H are different examples of the first unit pattern U1. Each of the first unit patterns U1 shown in FIGS. 9A-9H may be used to replace the first unit pattern U1 shown in FIG. 7 or FIG. 8, but the present disclosure is not limited thereto.

It should be noted that the second unit pattern U2, the third unit pattern U3, and the fourth unit pattern U4 are adjusted according to the first unit pattern U1. That is, the arrangement of the normal pixels (e.g., pixel R, pixel G, or pixel B) and the auto-focus pixel array PDAF in the second unit pattern U2, the third unit pattern U3, and the fourth unit pattern U4 may be changed according to the arrangement of the normal pixels (e.g., pixel R, pixel G, or pixel B) and the auto-focus pixel array PDAF in the first unit pattern U1. Furthermore, FIGS. 9A-9H may also be different examples of the second unit pattern U2, the third unit pattern U3, or the fourth unit pattern U4.

Figure 9B:
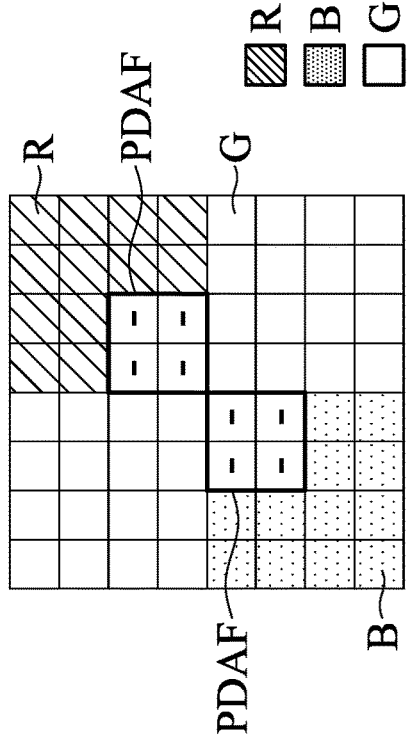
FIGS. 9A-9H are different examples of the first unit pattern.
Figure 9A:
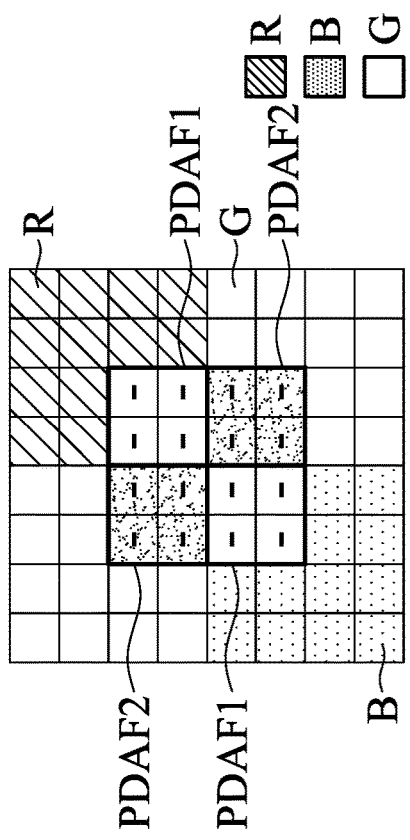
Figure 9D:
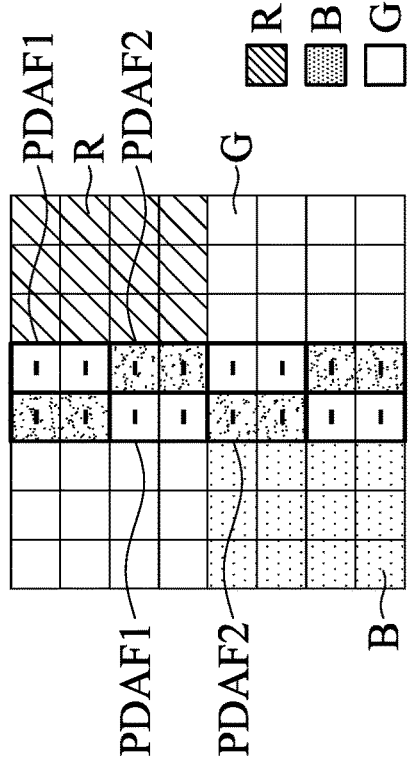
Figure 9C:
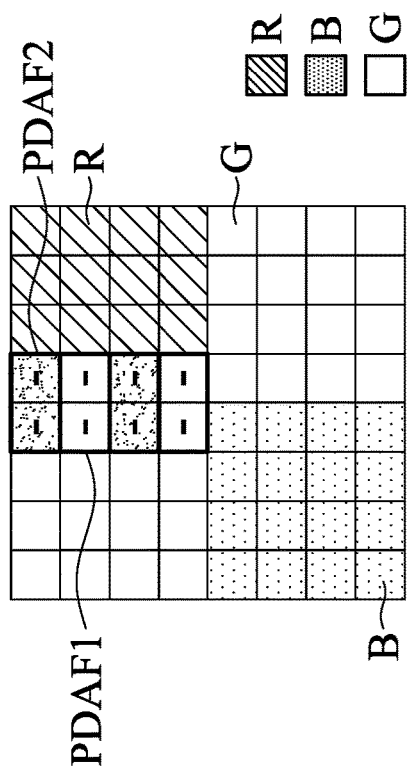

As shown in FIG. 9A, there are two auto-focus pixel arrays PDAF1 and two auto-focus pixel arrays PDAF2 in each first unit pattern U1. For example, the auto-focus pixel array PDAF1 and the auto-focus pixel array PDAF2 may be 2×2 pixel arrays, and the two auto-focus pixel arrays PDAF1 and the two auto-focus pixel arrays PDAF2 may be adjacent to each other. As shown in FIG. 9B, there are two auto-focus pixel arrays PDAF that are arranged diagonally, and the auto-focus pixel array PDAF may be a 2×2 pixel array. As shown in FIG. 9C, there are two auto-focus pixel arrays PDAF1 and two auto-focus pixel arrays PDAF2 that are staggered to each other, and the auto-focus pixel array PDAF1 and the auto-focus pixel array PDAF2 may be a 1×2 pixel arrays (or 2×1 pixel arrays). As shown in FIG. 9D, there are four auto-focus pixel arrays PDAF1 and four auto-focus pixel arrays PDAF2 that are staggered to each other, and the auto-focus pixel array PDAF1 and the auto-focus pixel array PDAF2 may be a 2×1 pixel arrays (or 1×2 pixel arrays).

Figure 9E:
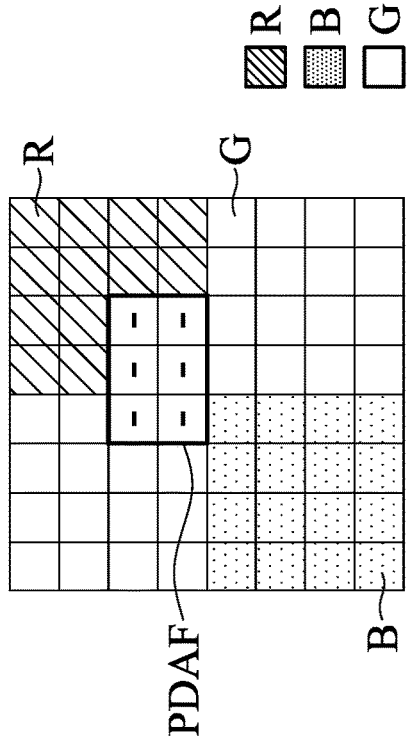
Figure 9F:
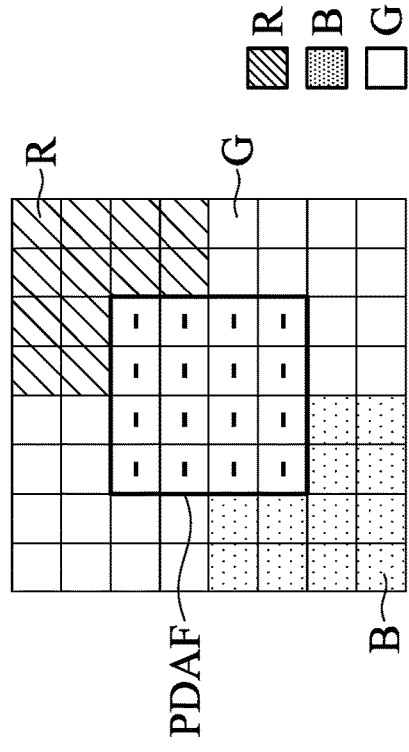
Figure 9G:
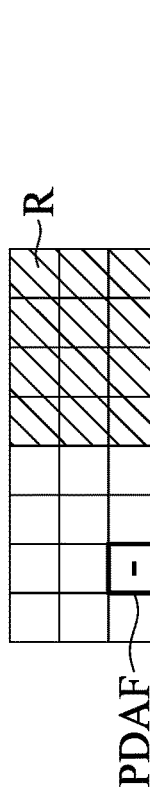
Figure 9H:
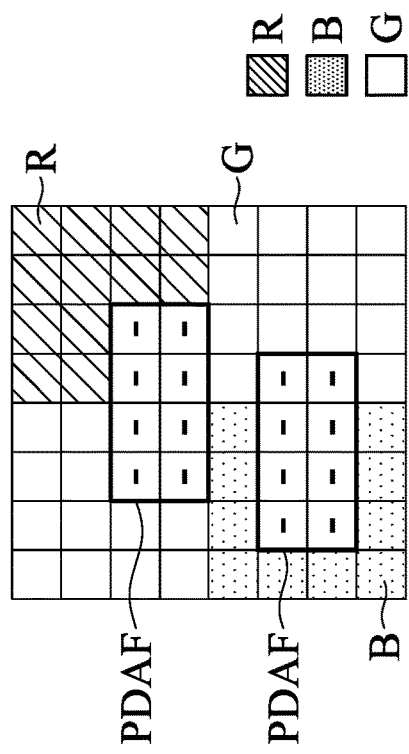

As shown in FIG. 9E, there are two auto-focus pixel arrays PDAF in each first unit pattern U1. For example, the auto-focus pixel arrays PDAF may be 3×1 pixel arrays (or 1×3 pixel arrays) that are separated from each other. As shown in FIG. 9F, the auto-focus pixel array PDAF is a 2×3 pixel array (or 3×2 pixel array) that is not disposed on the center of the first unit pattern U1. As shown in FIG. 9G, there are two auto-focus pixel arrays PDAF in each first unit pattern U1. For example, the auto-focus pixel arrays PDAF may be 2×4 pixel arrays (or 4×2 pixel arrays) that are separated from each other. As shown in FIG. 9H, the auto-focus pixel array PDAF is a 4×4 pixel array that is disposed on the center of the first unit pattern U1. It should be noted that the number of columns and rows in each auto-focus pixel array (PDAF, PDAF1 or PDAF2), and the number of auto-focus pixel arrays in one first unit pattern U1 are not limited to the forgoing examples, and they may be adjusted according to actual need.

In summary, according to the embodiments of the present disclosure, since the solid-state image sensor has aforementioned symmetrical pattern design, patterns on opposite sides (e.g., left side and right side, or upper side and lower side) don't need to adopt different and complicated image signal processing (ISP) (signal compensation), which may effectively simplify the image signal processing (signal compensation). Furthermore, in some embodiments, the solid-state image sensor may include the first insert pixel array and the second insert pixel array, which may further improve the resolution drop in the solid-state image sensor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A solid-state image sensor having a first region and a second region adjacent to the first region along a first direction, comprising:
    a first unit pattern disposed in the first region; and
    a second unit pattern disposed in the second region and corresponding to the first unit pattern;
    wherein each of the first unit pattern and the second unit pattern comprises normal pixels and an auto-focus pixel array, the normal pixels and the auto-focus pixel array in the first unit pattern form a first arrangement, the normal pixels and the auto-focus pixel array in the second unit pattern form a second arrangement, and the first arrangement and the second arrangement are symmetric with respect to a first axis of symmetry,
    wherein the solid-state image sensor has a third region adjacent to the first region along a second direction that is perpendicular to the first direction, and further comprises:
    a third unit pattern disposed in the third region and corresponding to the first unit pattern;
    wherein the third unit pattern comprises normal pixels and an auto-focus pixel array, the normal pixels and the auto-focus pixel array in the third unit pattern form a third arrangement, and the first arrangement and the third arrangement are symmetric with respect to a second axis of symmetry that is perpendicular to the first axis of symmetry,
    wherein the solid-state image sensor has a fourth region adjacent to the second region along the second direction, and further comprises:
    a fourth unit pattern disposed in the fourth region and corresponding to the second unit pattern;
    wherein the fourth unit pattern comprises normal pixels and an auto-focus pixel array, the normal pixels and the auto-focus pixel array in the fourth unit pattern form a fourth arrangement, and the second arrangement and the fourth arrangement are symmetric with respect to the second axis of symmetry,
    wherein each of the first unit pattern, the second unit pattern, the third unit pattern, and the fourth unit pattern is a $(2n)^2$ pixel array, where n is an integer greater than or equal to 2,
    wherein the solid-state image sensor farther comprises:
    a first insert pixel array disposed between the first unit pattern and the second unit pattern,
    wherein the first insert pixel array overlaps the first axis of symmetry.

2. The solid-state image sensor as claimed in claim 1, wherein the normal pixels in the first unit pattern and the second unit pattern receive at least two different colors.

3. The solid-state image sensor as claimed in claim 1, wherein the first insert pixel array is also disposed between the third unit pattern and the fourth unit pattern.

4. The solid-state image sensor as claimed in claim 1, wherein a number of columns in the first insert pixel array is n.

5. The solid-state image sensor as claimed in claim 1, wherein the first insert pixel array presents colors that correspond to colors presented in a first column of the first unit pattern and the third unit pattern.

6. The solid-state image sensor as claimed in claim 1, further comprising:
    a second insert pixel array disposed between the first unit pattern and the third unit pattern,
    wherein the second insert pixel array overlaps the second axis of symmetry.

7. The solid-state image sensor as claimed in claim 6, wherein the second insert pixel array is also disposed between the second unit pattern and the fourth unit pattern.

8. The solid-state image sensor as claimed in claim 6, wherein a number of rows in the second insert pixel array is n.

9. The solid-state image sensor as claimed in claim 6, wherein the second insert pixel array presents colors that correspond to colors presented in a first row of the first unit pattern and the second unit pattern.

10. The solid-state image sensor as claimed in claim 1, wherein the auto-focus pixel array of the first unit pattern, the second unit pattern, the third unit pattern, and the fourth unit pattern is a p×q pixel array, where p and q are integers less than 2n.

11. The solid-state image sensor as claimed in claim 1, wherein there is more than one auto-focus pixel array in each of the first unit pattern, the second unit pattern, the third unit pattern, and the fourth unit pattern.

12. The solid-state image sensor as claimed in claim 1, wherein the normal pixels of the first unit pattern, the second unit pattern, the third unit pattern, and the fourth unit pattern comprise first color pixels and second color pixels, the first color pixels are disposed in at least one $n^2$ pixel array, and the second color pixels are disposed in at least one $n^2$ pixel array.

13. The solid-state image sensor as claimed in claim 1, wherein the first unit pattern and the second unit pattern are located on opposite sides of a light source.

14. The solid-state image sensor as claimed in claim 1, wherein the normal pixels of the first unit pattern, the second unit pattern, the third unit pattern, and the fourth unit pattern comprise red color filters, green color filters, blue color filters, yellow color filters, white color filters, cyan color filters, magenta color filters, or IR/NIR color filters.

\* \* \* \* \*